US012240081B2

(12) United States Patent
Su

(10) Patent No.: US 12,240,081 B2
(45) Date of Patent: Mar. 4, 2025

(54) RAPID ADJUSTABLE WRENCH

(71) Applicant: Hong Ann Tool Industries Co., Ltd., Taichung (TW)

(72) Inventor: Cheng-Wei Su, Taichung (TW)

(73) Assignee: HONG ANN TOOL INDUSTRIES CO., LTD., Taichung (TW)

( * ) Notice: Subject to any disclaimer, the term of this patent is extended or adjusted under 35 U.S.C. 154(b) by 296 days.

(21) Appl. No.: 17/955,697

(22) Filed: Sep. 29, 2022

(65) Prior Publication Data

US 2023/0202003 A1 Jun. 29, 2023

(30) Foreign Application Priority Data

Dec. 24, 2021 (TW) ................................ 110148750
Feb. 21, 2022 (TW) ................................ 111106189

(51) Int. Cl.
*B25B 13/20* (2006.01)
*B25B 13/14* (2006.01)

(52) U.S. Cl.
CPC .............. *B25B 13/20* (2013.01); *B25B 13/14* (2013.01)

(58) Field of Classification Search
CPC .... B25B 7/02; B25B 7/04; B25B 7/10; B25B 7/12; B25B 7/123; B25B 7/14; B25B 13/00; B25B 13/10; B25B 13/12; B25B 13/14; B25B 13/20; B25B 13/22; B25B 13/24; B25B 13/26; B25B 13/40; B25B 13/42; B25B 13/46; B25B 13/48; B25B 23/0007; B25B 23/0021; B25B 23/0028
See application file for complete search history.

(56) References Cited

U.S. PATENT DOCUMENTS 1,228,850 A * 6/1917 Upson ..................... B25B 13/14 81/157
1,501,903 A * 7/1924 Gordon ................... B25B 13/14 81/157
1,523,093 A * 1/1925 Wilcox ................... B25B 13/22 81/145
5,209,144 A * 5/1993 Lu Guoji .................. B25B 7/02 81/135

FOREIGN PATENT DOCUMENTS

TW M474598 U 3/2014
WO WO-2007016690 A2 * 2/2007 ............ B25B 13/12

* cited by examiner

*Primary Examiner* — Robert J Scruggs
(74) *Attorney, Agent, or Firm* — Muncy, Geissler, Olds & Lowe, P.C

(57) ABSTRACT

A rapid adjustable wrench includes a body, a movable jaw, and an engaging device. The body has a fixed jaw, a sliding groove, and a containing recess. The movable jaw includes a sliding portion movably arranged in the sliding groove and a first toothed portion adjacent to the sliding portion. The engaging device includes an engaging member and a toggle switch. The engaging member is arranged in the containing recess and has a second toothed portion selectively engaged with the first toothed portion. One end of the toggle switch is connected to the engaging member. The toggle switch is able to drive the engaging member to move between an engaging position and a releasing position.

11 Claims, 11 Drawing Sheets

RAPID ADJUSTABLE WRENCH

BACKGROUND

The present invention relates to an adjustable wrench and, more particular, to a rapid adjustable wrench which can be rapidly adjusted the distance between two opposite jaws thereof.

Taiwan Utility Patent No. TWM474598 discloses an adjustable wrench, which includes a handle, a head, a movable jaw, an adjusting device, and a reinforcing device. The head is formed at one end of the handle and includes a fixed jaw, a sliding slot, a receiving slot, two side walls, and two connecting portions. The sliding slot and the receiving slot communicate each other and are formed between the two side walls. Each connecting portion is formed at one end of each side wall opposite to the fixed jaw. The movable jaw is slidably arranged in the sliding slot to be movable relative to the fixed jaw. The adjusting device is arranged in the receiving slot and includes a shaft and a worm gear. The shaft inserts through the worm gear engaged with the movable jaw. The reinforcing device is connected between the two side walls and fixed to the two connecting portions.

However, the adjustable wrench can only change the width between the fixed jaw and the movable jaw by rotating the worm gear, and the adjust operation is neither convenient nor fast.

Thus, a need exists for a novel rapid adjustable wrench to mitigate and/or obviate the above disadvantages.

SUMMARY

An objective of the present invention is to provide a rapid adjustable wrench including a body, a movable jaw, and an engaging device. The body has a handle and a fixed jaw opposite to the handle. The body defines a first side and a second side opposite to the first side. The body includes a sliding groove and a containing recess disposed between the first and second sides. The sliding groove is adjacent to the fixed jaw. The containing recess is communicated with the sliding groove and disposed opposite to the fixed jaw. The movable jaw includes a sliding portion and a first toothed portion adjacent to the sliding portion. The sliding portion is movably arranged in the sliding groove so that the movable jaw is movable closer to or away from the fixed jaw. The engaging device includes an engaging member and a toggle switch. The engaging member is arranged in the containing recess and has a second toothed portion. One end of the toggle switch is connected to the engaging member and the other end of the toggle switch protrudes out from the first side. The toggle switch is able to drive the engaging member to move between an engaging position and a releasing position. When the engaging member is in the engaging position, the second toothed portion is engaged with the first toothed portion and the movable jaw cannot move away from the fixed jaw. When the engaging member is in the releasing position, the second toothed portion is disengaged from the first toothed portion, and the movable jaw can arbitrarily move to closer to or away from the fixed jaw.

In an embodiment, the containing recess includes an external portion adjacent to the sliding groove and an internal portion connected to one side of the external portion opposite to the sliding groove. The engaging member is arranged in the external portion. The engaging device further includes a biasing member disposed on one side of the engaging member opposite to the movable jaw and located in the internal portion. The biasing member normally biases against the engaging member to the engaging position.

In an embodiment, the body has a limiting slot between the first side and the second side. The sliding groove is adjacent to the fixed jaw. The limiting slot is communicated with the sliding groove and disposed opposite to the fixed jaw to adjacent to the containing recess. One side of the limiting slot adjacent to the containing recess has a limiting portion. The movable jaw is connected with a limiting member connected to one end of the sliding portion adjacent to the fixed jaw and arranged into the limiting slot. The limiting member is moved in the limiting slot as the engaging member is moved between the engaging position and the releasing position. The limiting member is abutted against the limiting portion when the movable jaw is away from the fixed jaw.

In an embodiment, the containing recess includes a first side portion and a second side portion. The first side portion is communicated with the external portion and the first side. The toggle switch is inserted through the first side portion from the first side and connected to the engaging member. The second side portion is communicated with the external portion and the second side. The engaging device includes a cover arranged on the second side portion.

In an embodiment, the engaging member has a through hole. One side of the cover adjacent to the engaging member has a guiding slot. The toggle switch passes through the through hole and is inserted into the guiding slot. The toggle switch is moved in the guiding slot as the engaging member is moved between the engaging position and the releasing position.

In an embodiment, the cover is connected with two fasteners penetrating therethrough and threaded coupled with the body. The two fasteners are respectively located at two opposite sides of the guiding slot.

In an embodiment, the engaging member and the toggle switch synchronously move along a linear track when the engaging member is moved between the engaging position and the releasing position.

In another embodiment, the containing recess has a pivoting portion connected to one side of the external portion adjacent to the first side. The engaging member is connected with a pivotal stem inserting into the pivoting portion. The engaging member and the toggle switch synchronously rotate about the pivotal stem when the engaging member is moved between the engaging position and the releasing position.

In another embodiment, an inner periphery of the external portion has a first inner face and a second inner face. The first inner face is a flat face. The second inner face is a concave arc face and disposed on one side of the first inner face opposite to the fixed jaw. The pivotal stem is adjacent to the second inner face and disposed at one side of the second toothed portion opposite to the fixed jaw. One end of the biasing member has a first biasing portion abutting against the second inner face, and another end of the biasing member has a second biasing portion abutting against the engaging member. A flexible portion is formed between the first biasing portion and the second biasing portion in a bending deformation manner, and the flexible portion is adjacent to the pivotal stem.

In another embodiment, the body has a toothed wheel recess formed between the first side and the second side. The toothed wheel recess is communicated with the sliding groove and disposed opposite to the fixed jaw. The engaging device includes a toothed wheel pivotally connected to the body and arranged into the toothed wheel recess. An outer periphery of the toothed wheel has a third toothed portion engaged with the first toothed portion to drive the movable jaw.

In another embodiment, the rapid adjustable wrench as claimed in claim 10. The body has a limiting recess arranged in a bottom of the toothed wheel recess. The toothed wheel has a limiting flange slidably inserted into limiting recess.

In another embodiment, the handle has a first narrow side and a second narrow side opposite to the first narrow side. The fixed jaw is adjacent to the first narrow side. The movable jaw is adjacent to the second narrow side. The toothed wheel recess is disposed at a portion of the handle adjacent to the fixed jaw and connected to the first narrow side. The toothed wheel protrudes from the first narrow side. The toothed wheel is synchronously connected with a thumb wheel protruding from the first side to be rotatable together.

In another embodiment, the movable jaw can only move in a direction toward the fixed jaw when the engaging member is in the engaging position.

The present invention will become clearer in light of the following detailed description of illustrative embodiments of this invention described in connection with the drawings.

DETAILED DESCRIPTION

Figure 1:
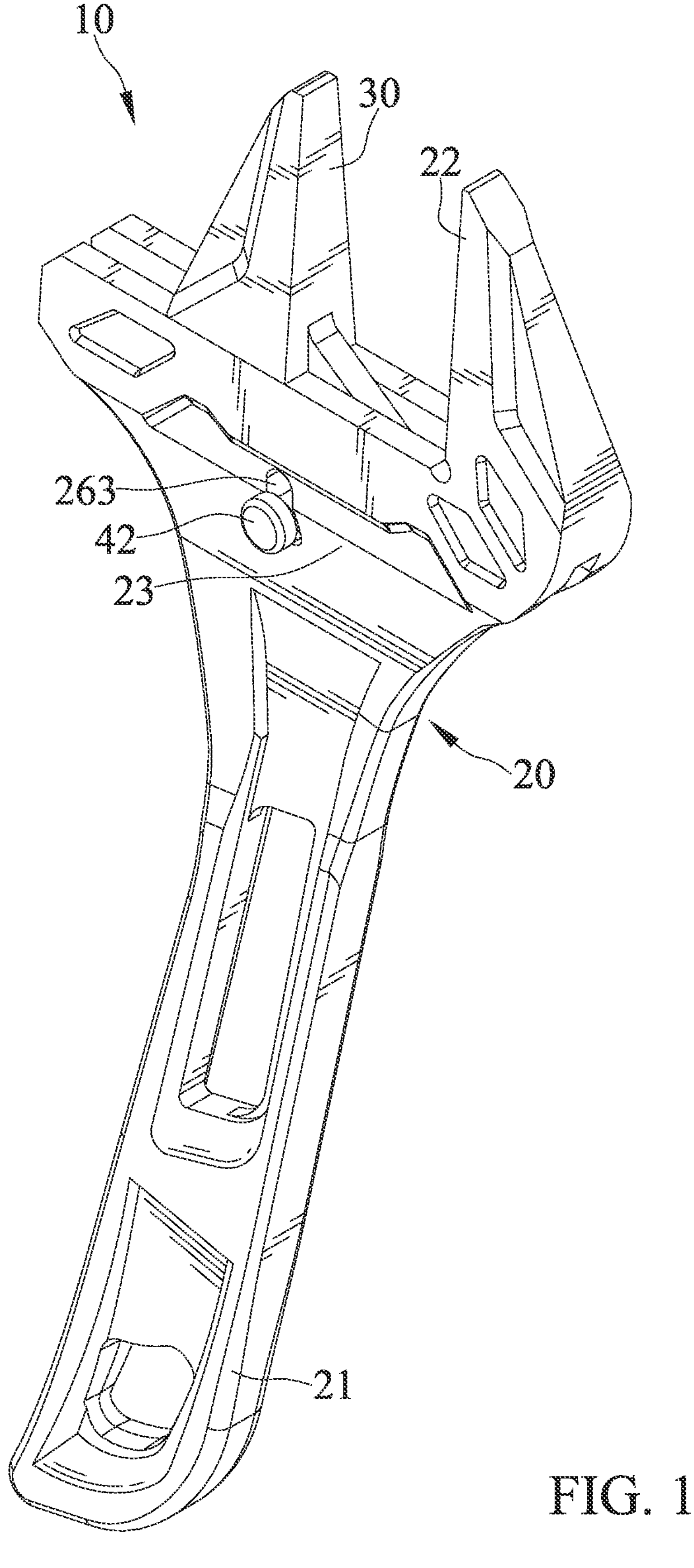
FIG. 1 is a perspective view of a rapid adjustable wrench of a first embodiment according to the present invention.
Figure 2:
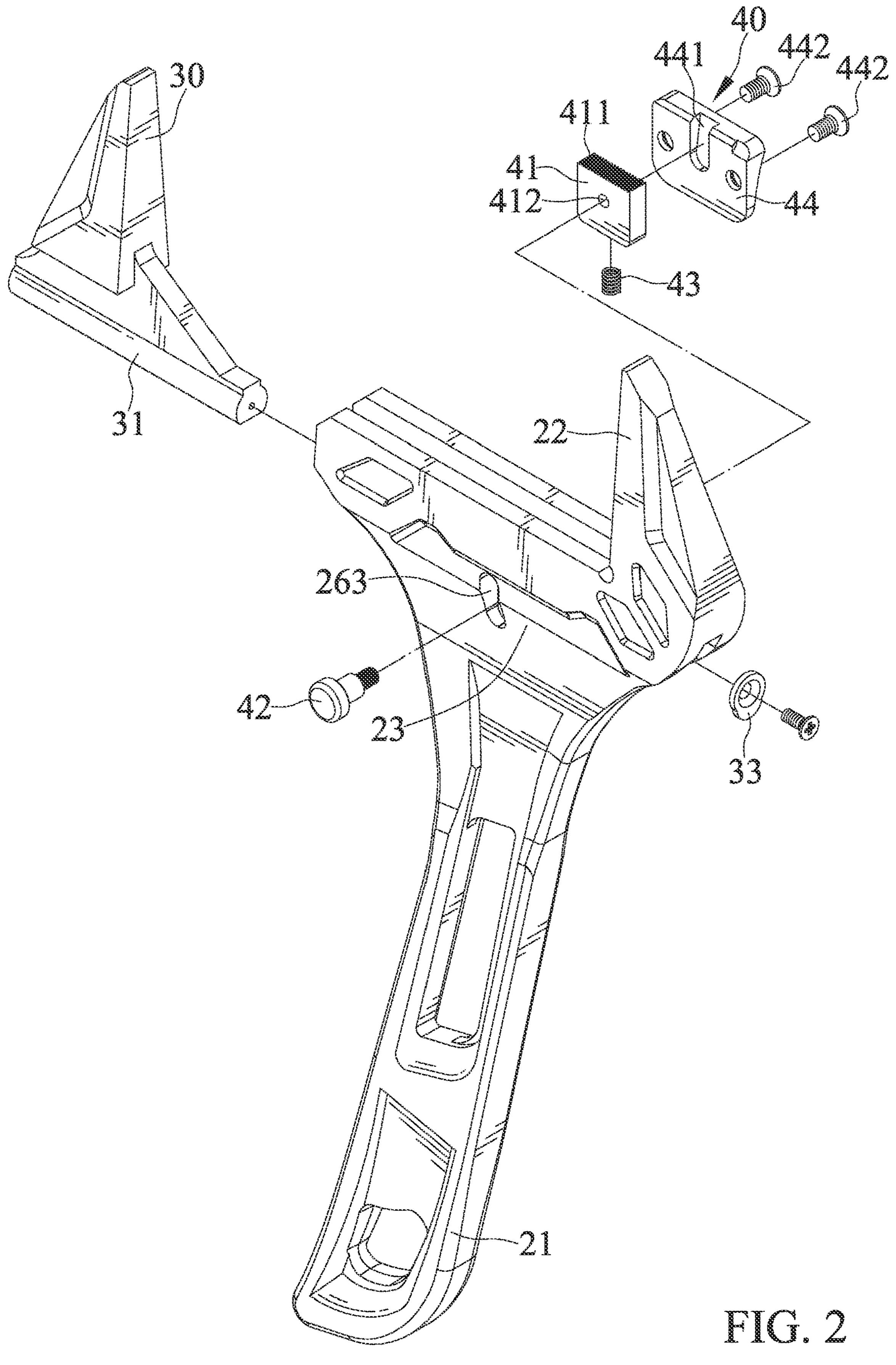
FIG. 2 is an exploded perspective view of the rapid adjustable wrench of FIG. 1.
Figure 3:
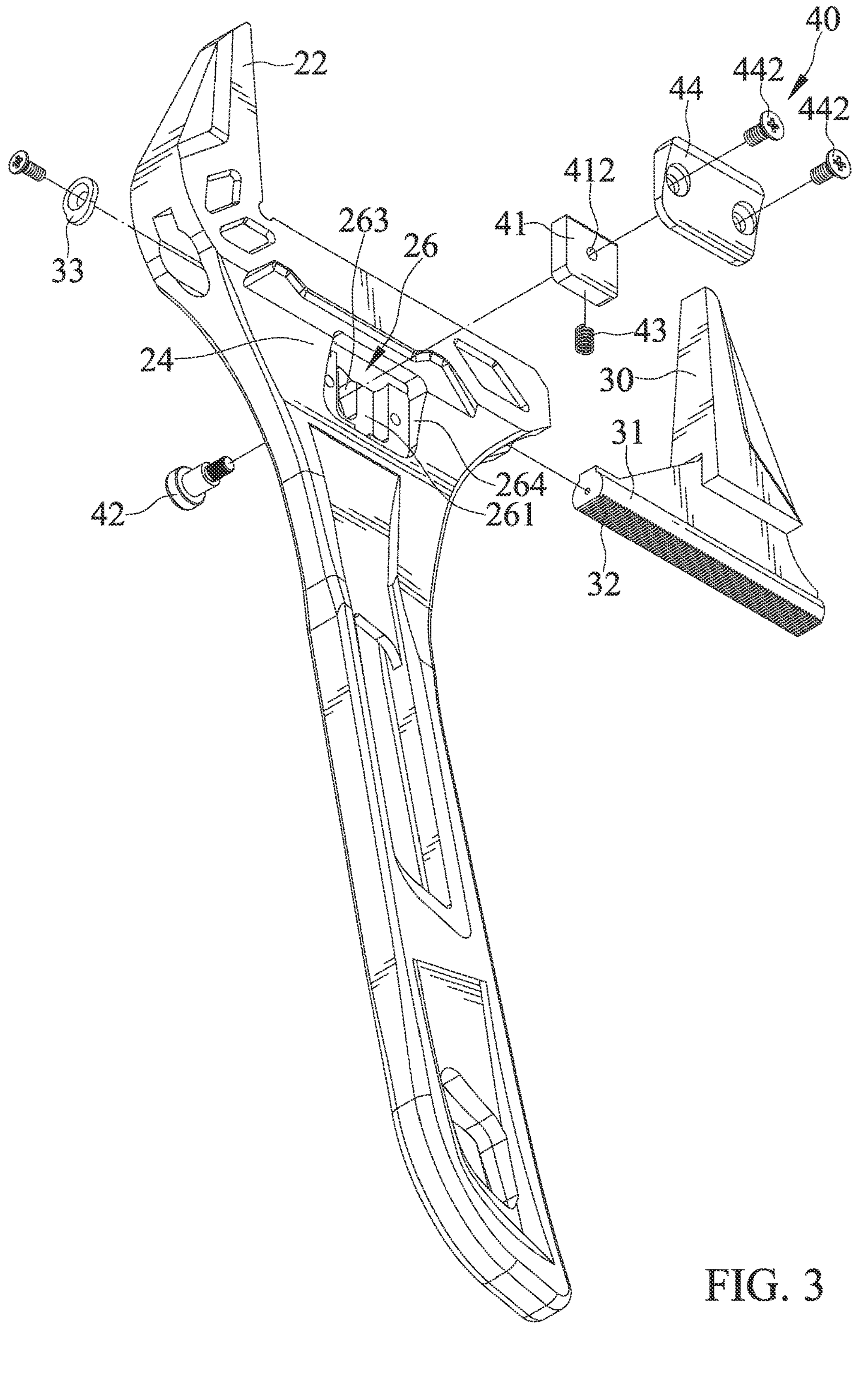
FIG. 3 is another exploded perspective view of the rapid adjustable wrench of FIG. 1.
Figure 4:
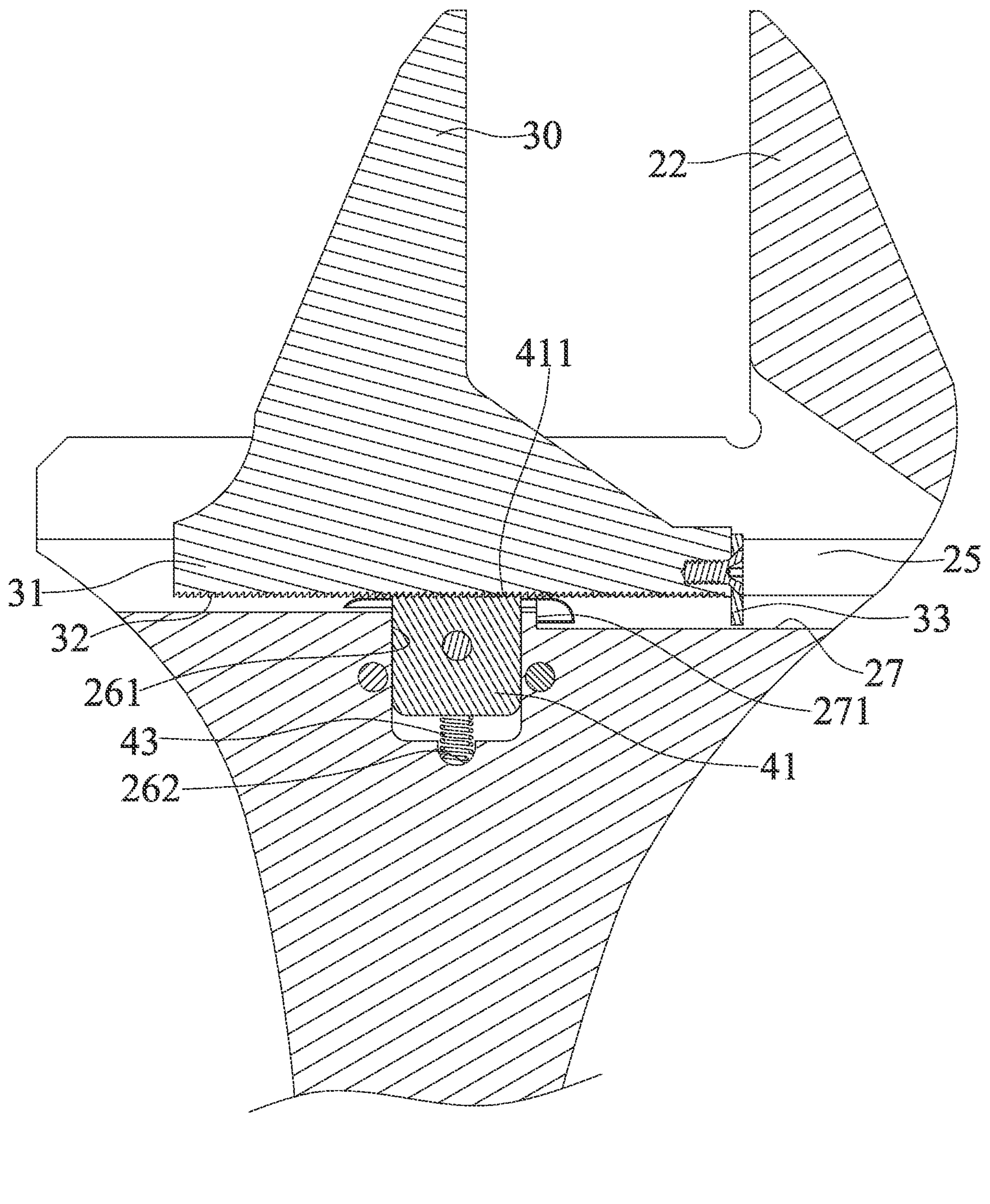
FIG. 4 is a cross sectional view of the rapid adjustable wrench of FIG. 1 and shows the engaging member being arranged in an engaging position.
Figure 5:
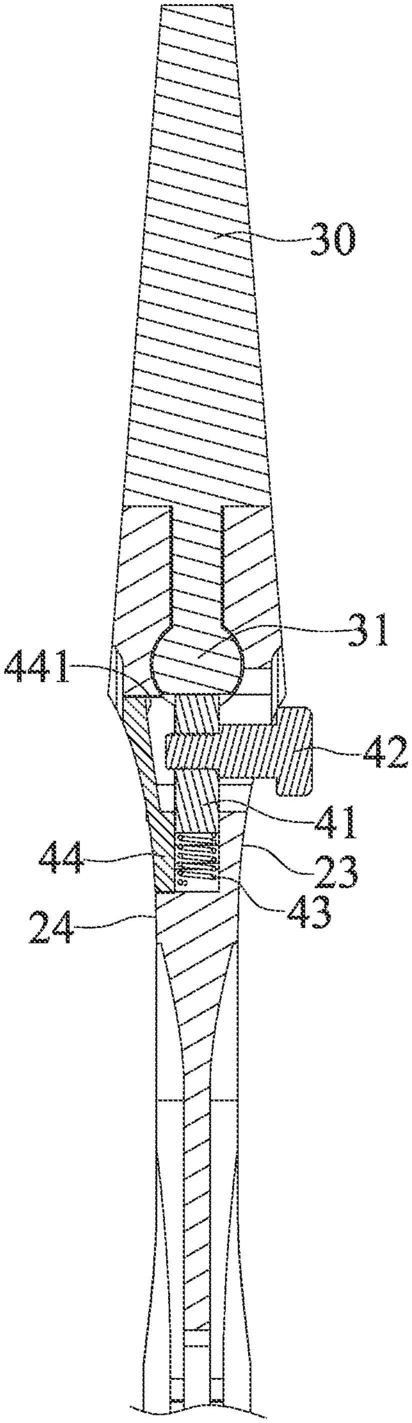
FIG. 5 is another cross sectional view of the rapid adjustable wrench of FIG. 1.
Figure 6:
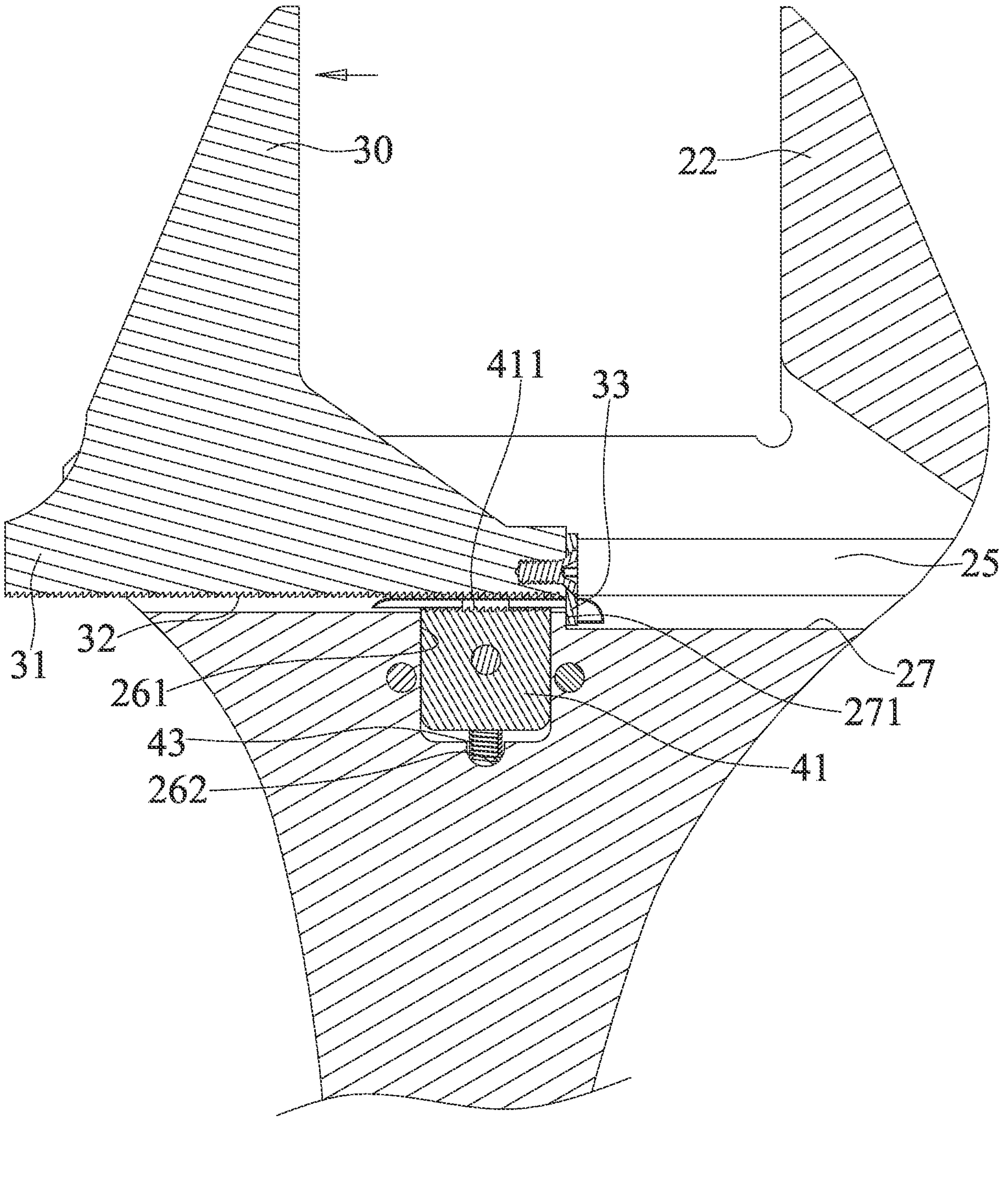
FIG. 6 is another cross sectional view of the rapid adjustable wrench of FIG. 1 and shows the engaging member being arranged in a releasing position.

FIGS. 1-6 show a rapid adjustable wrench 10 of a first embodiment according to the present invention. The rapid adjustable wrench 10 includes a body 20, a movable jaw 30, and an engaging device 40.

The body 20 has a handle 21 and a fixed jaw 22 opposite to the handle 21. The body 20 defines a first side 23 and a second side 24 opposite to the first side 23. The body 20 includes a sliding groove 25 and a containing recess 26 disposed between the first and second sides 23 and 24. The sliding groove 25 is adjacent to the fixed jaw 22. The containing recess 26 is communicated with the sliding groove 25 and disposed opposite to the fixed jaw 22.

The movable jaw 30 includes a sliding portion 31 and a first toothed portion 32 adjacent to the sliding portion 31. The sliding portion 31 is movably arranged in the sliding groove 25 so that the movable jaw 30 is movable closer to or away from the fixed jaw 22.

The engaging device 40 includes an engaging member 41 and a toggle switch 42. The engaging member 41 is arranged in the containing recess 26 and has a second toothed portion 411. One end of the toggle switch 42 is connected to the engaging member 41 and the other end of the toggle switch 42 protrudes out from the first side 23. The engaging member 41 and the toggle switch 42 may be a integrally formed single component or two components formed separately and assembled together. The toggle switch 42 is able to drive the engaging member 41 to move between an engaging position and a releasing position. When the engaging member 41 is in the engaging position, the second toothed portion 411 is engaged with the first toothed portion 32, and the movable jaw 30 cannot move away from the fixed jaw 22. When the engaging member 41 is in the releasing position, the second toothed portion 411 is disengaged from the first toothed portion 32, and the movable jaw 30 can arbitrarily move to closer to or away from the fixed jaw 22.

The containing recess 26 includes an external portion 261 adjacent to the sliding groove 25 and an internal portion 262 connected to one side of the external portion 261 opposite to the sliding groove 25. The engaging member 41 is arranged in the external portion 261. The engaging device 40 further includes a biasing member 43 disposed on one side of the engaging member 41 opposite to the movable jaw 30 and located in the internal portion 262. The biasing member 43 normally biases against the engaging member 41 to the engaging position.

The body 20 has a limiting slot 27 between the first side 23 and the second side 24. The sliding groove 25 is adjacent to the fixed jaw 22. The limiting slot 27 is communicated with the sliding groove 25 and disposed opposite to the fixed jaw 22 to adjacent to the containing recess 26. One side of the limiting slot 27 adjacent to the containing recess 26 has a limiting portion 271. The movable jaw 30 is connected with a limiting member 33 connected to one end of the sliding portion 31 adjacent to the fixed jaw 22 and arranged into the limiting slot 27. The limiting member 33 is moved in the limiting slot 27 as the engaging member 41 is moved between the engaging position and the releasing position. The limiting member 33 is abutted against the limiting portion 271 when the movable jaw 30 is away from the fixed jaw 22.

The containing recess 26 includes a first side portion 263 and a second side portion 264. The first side portion 263 is communicated with the external portion 261 and the first side 23. The toggle switch 42 is inserted through the first side portion 263 from the first side 23 and connected to the engaging member 41. The second side portion 264 is communicated with the external portion 261 and the second side 24. The engaging device 40 includes a cover 44 arranged on the second side portion 264.

The engaging member 41 has a through hole 412. One side of the cover 44 adjacent to the engaging member 41 has a guiding slot 441. The toggle switch 42 passes through the through hole 412 and is inserted into the guiding slot 441. The toggle switch 42 is moved in the guiding slot 441 as the engaging member 41 is moved between the engaging position and the releasing position.

The cover 44 is connected with two fasteners 442 penetrating therethrough and threaded coupled with the body 20. The two fasteners 442 are respectively located at two opposite sides of the guiding slot 441.

Further, the engaging member 41 and the toggle switch 42 synchronously move along a linear track when the engaging member 41 is moved between the engaging position and the releasing position.

The movable jaw 30 can only move in a direction toward the fixed jaw 22 when the engaging member 41 is in the engaging position.

Thus, the adjustable wrench 10 can rapidly adjusted a distance between the fixed jaw 22 and the movable jaw 30 without rotating a worm gear. When the toggle switch 42 is toggled to move the engaging member 41 to the releasing position, the user can move the movable jaw 30 to an appropriate position arbitrarily, so that the distance between the fixed jaw 22 and the movable jaw 30 can be adjusted rapidly.

Figure 7:
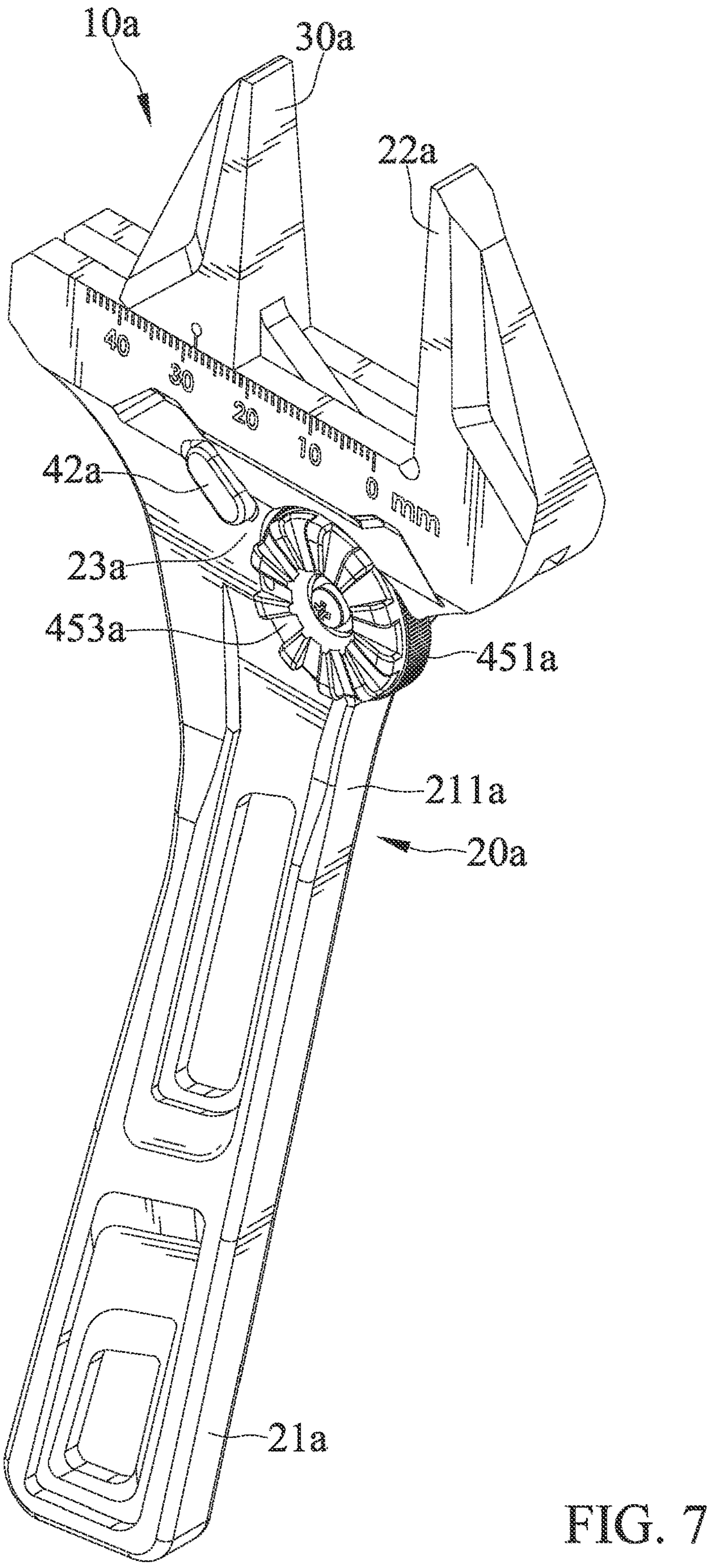
FIG. 7 is a perspective view of a rapid adjustable wrench of a second embodiment according to the present invention.
Figure 8:
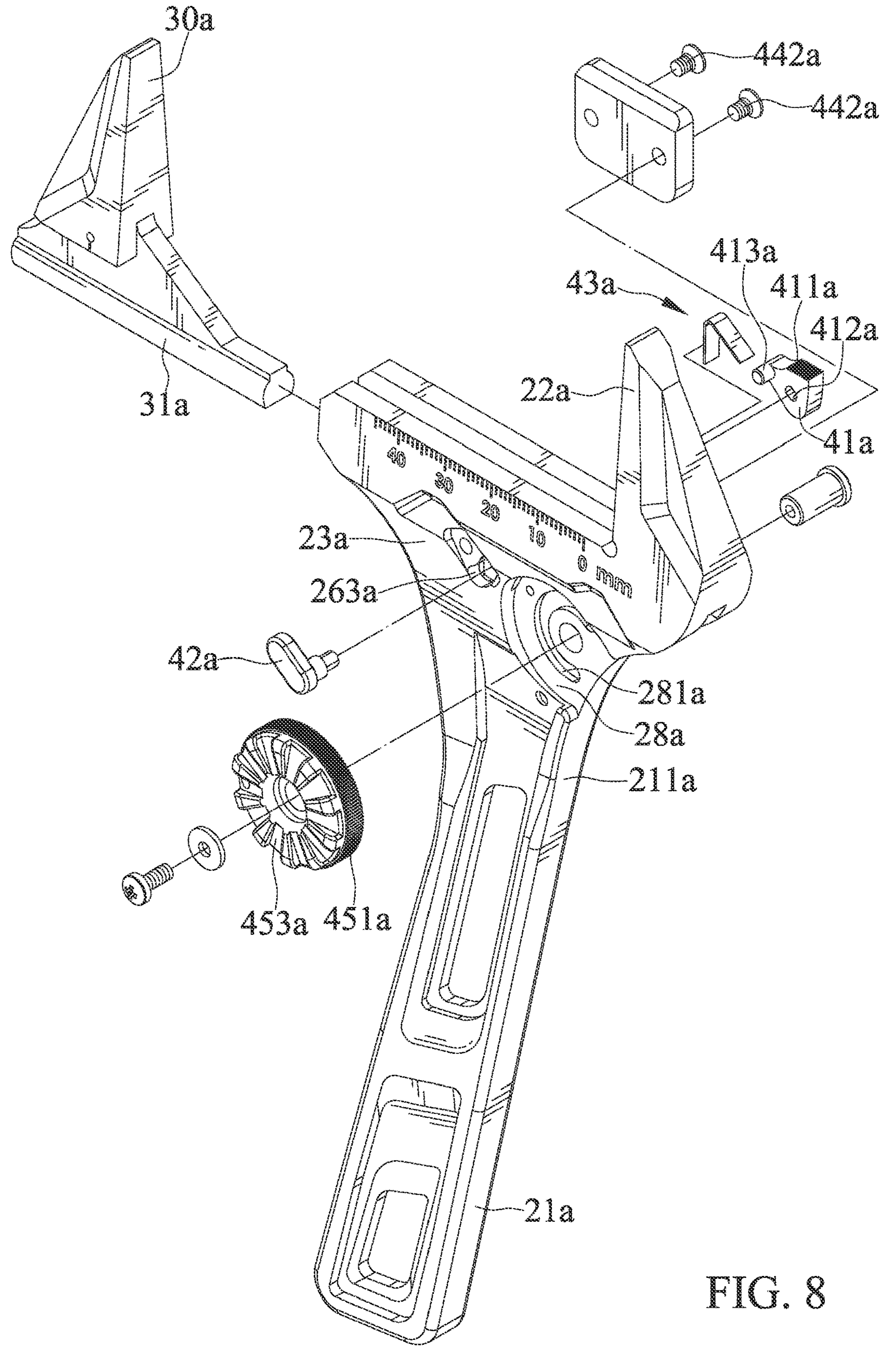
FIG. 8 is an exploded perspective view of the rapid adjustable wrench of FIG. 7.
Figure 9:
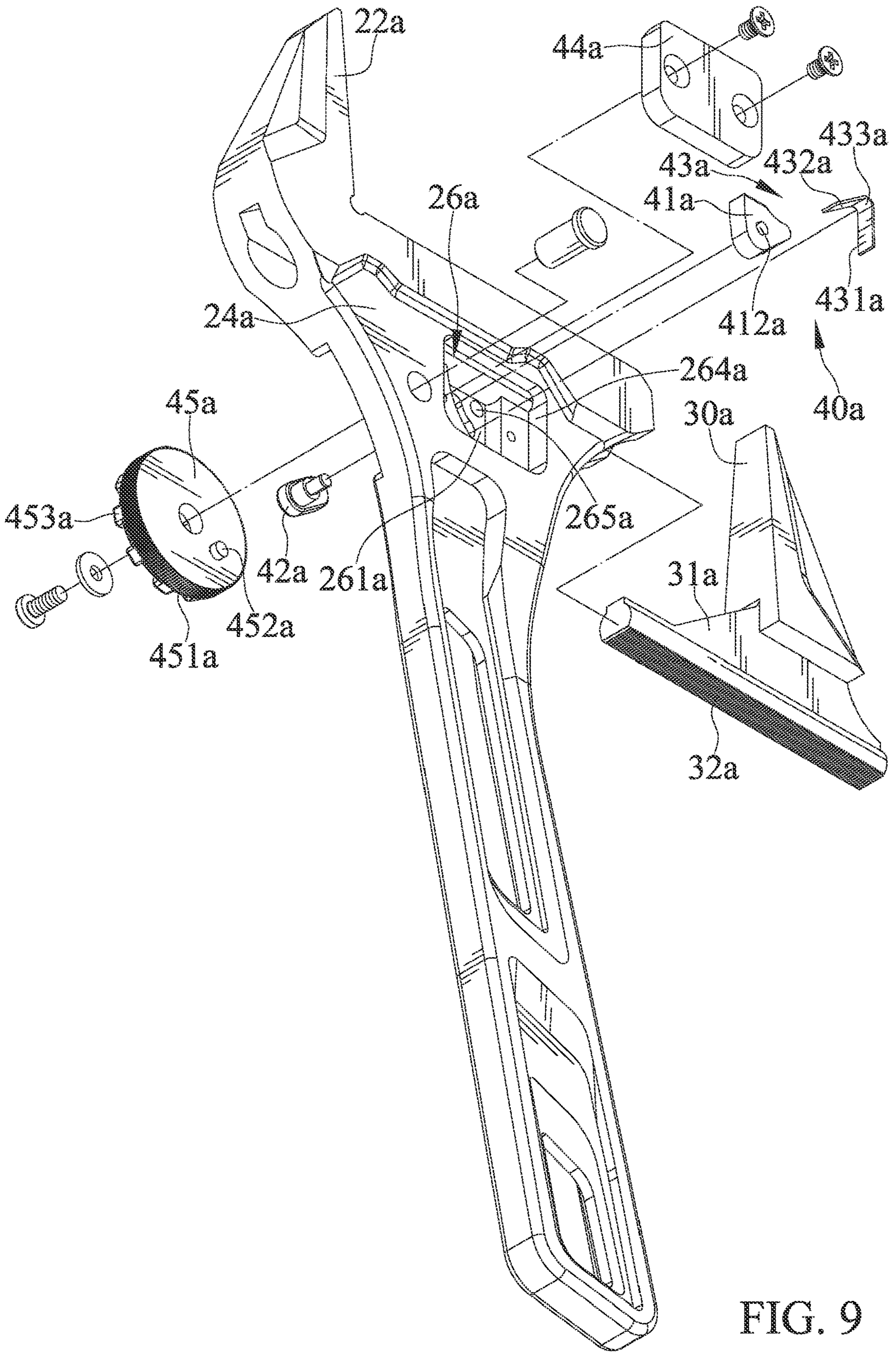
FIG. 9 is another exploded perspective view of the rapid adjustable wrench of FIG. 7.
Figure 10:
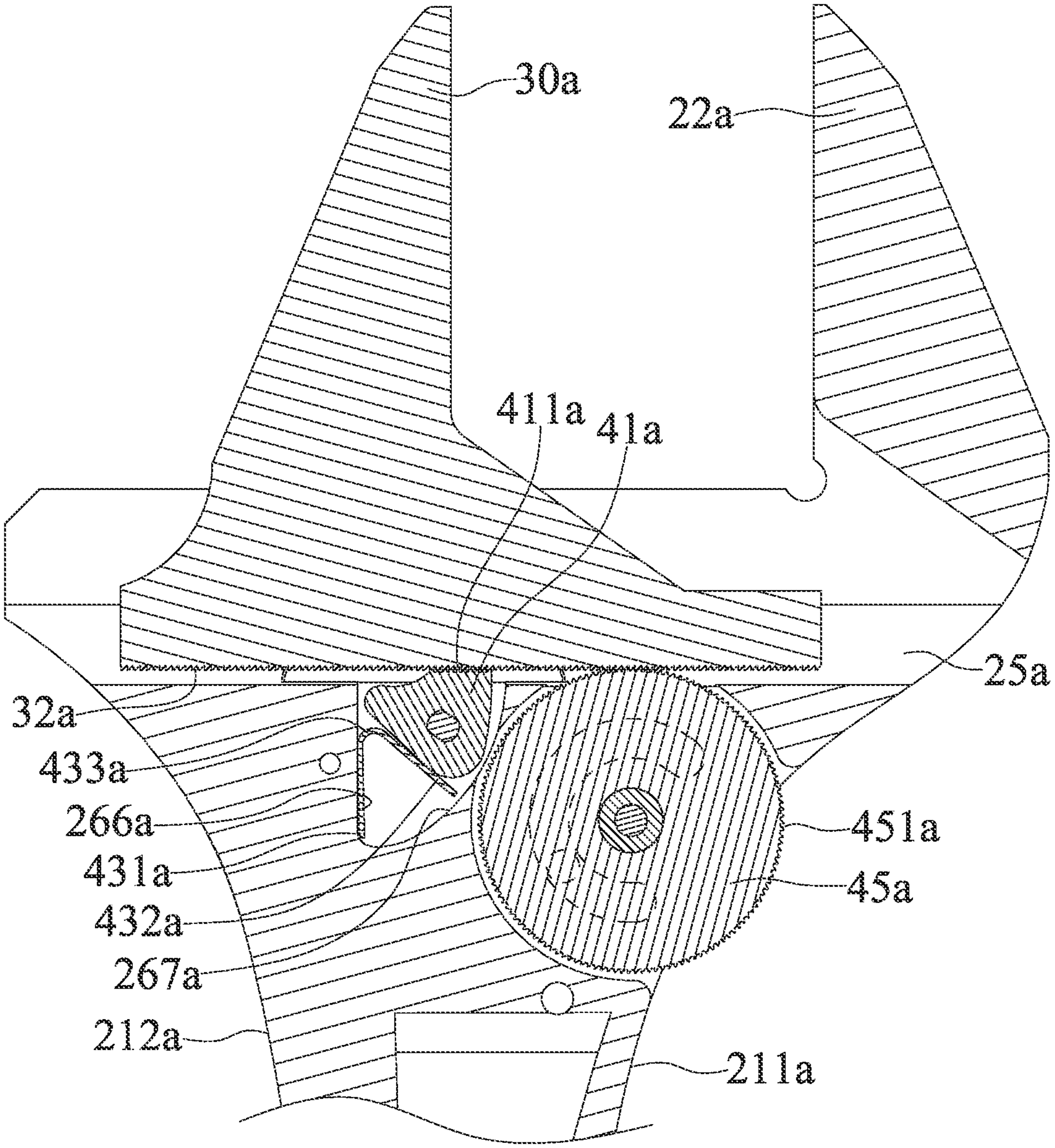
FIG. 10 is a cross sectional view of the rapid adjustable wrench of FIG. 7 and shows the engaging member being arranged in an engaging position.
Figure 11:
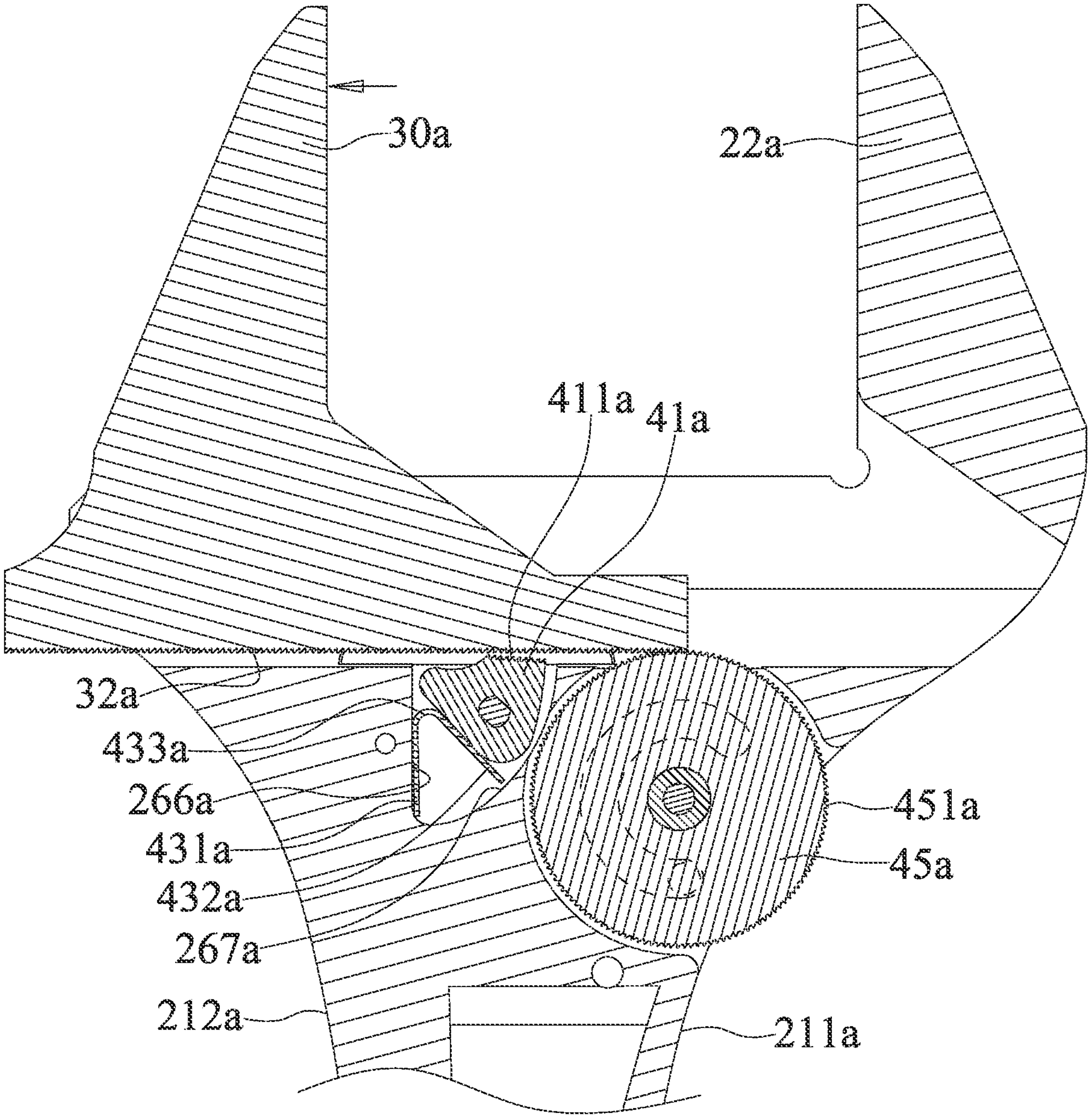
FIG. 11 is a cross sectional view of the rapid adjustable wrench of FIG. 7 and shows the engaging member being arranged in a releasing position.

FIGS. 7-11 show a rapid adjustable wrench of a second embodiment according to the present invention. The second embedment is substantially the same as the first embodiment. The main differences are that the containing recess 26*a* has a pivoting portion 265*a* connected to one side of the external portion 261*a* adjacent to the first side 23*a*. The engaging member 41*a* is connected with a pivotal stem 413*a* inserting into the pivoting portion 265*a*. The engaging member 41*a* and the toggle switch 42*a* synchronously rotate about the pivotal stem 413*a* when the engaging member 41*a* is moved between the engaging position and the releasing position.

An inner periphery of the external portion 261*a* has a first inner face 266*a* and a second inner face 267*a*. The first inner face 266*a* is a flat face, and the second inner face 267*a* is a concave arc face and disposed on one side of the first inner face 266*a* opposite to the fixed jaw 22*a*. The pivotal stem 413*a* is adjacent to the second inner face 267*a* and disposed at one side of the second toothed portion 411*a* opposite to the fixed jaw 22*a*. One end of the biasing member 43*a* has a first biasing portion 431*a* abutting against the second inner face 267*a*, and another end of the biasing member 43*a* has a second biasing portion 432*a* abutting against the engaging member 41*a*. A flexible portion 433*a* is formed between the first biasing portion 431*a* and the second biasing portion 432*a* in a bending deformation manner, and the flexible portion 433*a* is adjacent to the pivotal stem 413*a*.

The body 20*a* has a toothed wheel recess 28*a* formed between the first side 23*a* and the second side 24*a*. The toothed wheel recess 28*a* is communicated with the sliding groove 25*a* and disposed opposite to the fixed jaw 22*a*. The engaging device 40*a* includes a toothed wheel 45*a* pivotally connected to the body 20*a* and arranged into the toothed wheel recess 28*a*. An outer periphery of the toothed wheel 45*a* has a third toothed portion 451*a* engaged with the first toothed portion 32*a* to drive the movable jaw 30*a*.

The body 20*a* has a limiting recess 281*a* arranged in a bottom of the toothed wheel recess 28*a* and adjacent to the second side 24*a*. The toothed wheel 45*a* has a limiting flange 452*a* slidably inserted into limiting recess 281*a*.

The handle 21*a* has a first narrow side 211*a* and a second narrow side 212*a* opposite to the first narrow side 211*a*. The fixed jaw 22*a* is adjacent to the first narrow side 211*a*. The movable jaw 30*a* is adjacent to the second narrow side 212*a*. The toothed wheel recess 28*a* is disposed at a portion of the handle 21*a* adjacent to the fixed jaw 22*a* and connected to the first narrow side 211*a*. The toothed wheel 45*a* protrudes from the first narrow side 211*a* and has a thumb wheel 453*a* protruding from the first side 23*a*. The thumb wheel 453*a* may be integrally formed with the toothed wheel 45*a*.

Although specific embodiments have been illustrated and described, numerous modifications and variations are still possible without departing from the scope of the invention. The scope of the invention is limited by the accompanying claims.

The invention claimed is:

1. A rapid adjustable wrench comprising:

a body having a handle and a fixed jaw opposite to the handle, wherein the body defines a first side and a second side opposite to the first side, wherein the body includes a sliding groove and a containing recess disposed between the first and second sides, wherein the sliding groove is adjacent to the fixed jaw, wherein the containing recess is communicated with the sliding groove and disposed opposite to the fixed jaw, wherein the containing recess includes an external portion adjacent to the sliding groove and an internal portion connected to one side of the external portion opposite to the sliding groove, wherein the containing recess has a pivoting portion connected to one side of the external portion adjacent to the first side;

a movable jaw including a sliding portion and a first toothed portion adjacent to the sliding portion, wherein the sliding portion is movably arranged in the sliding groove so that the movable jaw is movable closer to or away from the fixed jaw; and an engaging device including an engaging member and a toggle switch, wherein the engaging member is arranged in the external portion of the containing recess and has a second toothed portion, wherein one end of the toggle switch is connected to the engaging member and the other end of the toggle switch protrudes out from the first side, wherein the toggle switch is able to drive the engaging member to move between an engaging position and a releasing position, wherein the engaging device further includes a biasing member disposed on one side of the engaging member opposite to the movable jaw and located in the internal portion, and wherein the biasing member normally biases against the engaging member to the engaging position, wherein the engaging member is connected with a pivotal stem inserting into the pivoting portion, wherein the engaging member and the toggle switch synchronously rotate about the pivotal stem when the engaging member is moved between the engaging position and the releasing position;

wherein when the engaging member is in the engaging position, the second toothed portion is engaged with the first toothed portion and the movable jaw cannot move away from the fixed jaw;

wherein when the engaging member is in the releasing position, the second toothed portion is disengaged from the first toothed portion, and the movable jaw can arbitrarily move to closer to or away from the fixed jaw.

2. The rapid adjustable wrench as claimed in claim 1, wherein the body has a limiting slot between the first side and the second side, wherein the sliding groove is adjacent to the fixed jaw, wherein the limiting slot is communicated with the sliding groove and disposed opposite to the fixed jaw to adjacent to the containing recess, wherein one side of the limiting slot adjacent to the containing recess has a limiting portion, wherein the movable jaw is connected with a limiting member connected to one end of the sliding portion adjacent to the fixed jaw and arranged into the limiting slot, wherein the limiting member is moved in the limiting slot as the engaging member is moved between the engaging position and the releasing position, and wherein the limiting member is abutted against the limiting portion when the movable jaw is away from the fixed jaw.

3. The rapid adjustable wrench as claimed in claim 1, wherein the containing recess includes a first side portion and a second side portion, wherein the first side portion is communicated with the external portion and the first side, wherein the toggle switch is inserted through the first side portion from the first side and connected to the engaging member, wherein the second side portion is communicated with the external portion and the second side, and wherein the engaging device includes a cover arranged on the second side portion.

4. The rapid adjustable wrench as claimed in claim 3, wherein the engaging member has a through hole, wherein one side of the cover adjacent to the engaging member has a guiding slot, wherein the toggle switch passes through the through hole and is inserted into the guiding slot, wherein the toggle switch is moved in the guiding slot as the engaging member is moved between the engaging position and the releasing position.

5. The rapid adjustable wrench as claimed in claim 4, wherein the cover is connected with two fasteners penetrating therethrough and threaded coupled with the body, and wherein the two fasteners are respectively located at two opposite sides of the guiding slot.

6. The rapid adjustable wrench as claimed in claim 5, wherein the engaging member and the toggle switch synchronously move along a linear track when the engaging member is moved between the engaging position and the releasing position.

7. The rapid adjustable wrench as claimed in claim 1, wherein an inner periphery of the external portion has a first inner face and a second inner face, wherein the first inner face is a flat face, wherein the second inner face is a face and disposed on one side of the first inner face opposite to the fixed jaw, wherein the pivotal stem is adjacent to the second inner face and disposed at one side of the second toothed portion opposite to the fixed jaw, wherein one end of the biasing member has a first biasing portion abutting against the second inner face, and another end of the biasing member has a second biasing portion abutting against the engaging member, and wherein a flexible portion is formed between the first biasing portion and the second biasing portion in a bending deformation manner, and wherein the flexible portion is adjacent to the pivotal stem.

8. The rapid adjustable wrench as claimed in claim 1, wherein the body has a toothed wheel recess formed between the first side and the second side, wherein the toothed wheel recess is communicated with the sliding groove and disposed opposite to the fixed jaw, wherein the engaging device includes a toothed wheel pivotally connected to the body and arranged into the toothed wheel recess, and wherein an outer periphery of the toothed wheel has a third toothed portion engaged with the first toothed portion to drive the movable jaw.

9. The rapid adjustable wrench as claimed in claim 8, wherein the body has a limiting recess arranged in a bottom of the toothed wheel recess, and wherein the toothed wheel has a limiting flange slidably inserted into limiting recess.

10. The rapid adjustable wrench as claimed in claim 8, wherein the handle has a first narrow side and a second narrow side opposite to the first narrow side, wherein the fixed jaw is adjacent to the first narrow side, wherein the movable jaw is adjacent to the second narrow side, wherein the toothed wheel recess is disposed at a portion of the handle adjacent to the fixed jaw and connected to the first narrow side, wherein the toothed wheel protrudes from the first narrow side and has a thumb wheel.

11. The rapid adjustable wrench as claimed in claim 1, wherein the movable jaw can only move in a direction toward the fixed jaw when the engaging member is in the engaging position.

* * * * *